(12) United States Patent
Chen et al.

(10) Patent No.: US 7,568,099 B2
(45) Date of Patent: Jul. 28, 2009

(54) METHOD AND APPARATUS FOR AVOIDING IKE PROCESS CONFLICT

(75) Inventors: Chia-Yuan Chen, Hsin-Chu (TW); Chi-Wei Chiang, Hsin-Chu (TW)

(73) Assignee: Zyxel Communications Corporation (TW)

( * ) Notice: Subject to any disclaimer, the term of this patent is extended or adjusted under 35 U.S.C. 154(b) by 776 days.

(21) Appl. No.: 11/088,730

(22) Filed: Mar. 25, 2005

(65) Prior Publication Data
US 2006/0215674 A1 Sep. 28, 2006

(51) Int. Cl.
*H04L 9/00* (2006.01)
(52) U.S. Cl. .................................................. 713/171
(58) Field of Classification Search ................ 713/171; 709/220, 227, 238; 380/277; 726/3
See application file for complete search history.

(56) References Cited

U.S. PATENT DOCUMENTS 7,120,930 B2 * 10/2006 Maufer et al. ................. 726/11
7,283,476 B2 * 10/2007 Bare .......................... 370/236

* cited by examiner

*Primary Examiner*—Emmanuel L Moise
*Assistant Examiner*—Ali S Abyaneh

(57) ABSTRACT

A method for avoiding IKE process conflict includes the steps in that a first gateway sends a first IKE request packet and receives a second IKE request packet from a second gateway. Afterward a decision is performed to decide whether the first gateway is an initiator or a responder. If the first gateway is an initiator, the first gateway will drop the received second IKE request packets and continue working as an initiator. If the first gateway is a responder, then first gateway will cancel the pre-sent first IKE request packet and work as a responder, and will perform IKE negotiation according to the second IKE packet. The present invention also discloses an apparatus for realizing above method.

4 Claims, 4 Drawing Sheets

METHOD AND APPARATUS FOR AVOIDING IKE PROCESS CONFLICT

BACKGROUND OF THE INVENTION

1. Field of the Invention

The present invention relates to an apparatus for avoiding network communication conflict and method for the same, and more particularly to an apparatus for avoiding Internet Key Exchange (IKE) process conflict and method for the same.

2. Description of the Prior Art

With the increasing prevalence of the Internet, communication and encryption technology are also under extensive research. Among encryption techniques, Internet Protocol Security (IPSec) is a very attractive encryption and tunnel methodology because of its low cost and excellent security. Therefore, IPSec is extensively used for business application.

FIG. 1(a) shows a prior art IPSec topology, wherein a first gateway 101 functioning as an initiator communicates with a second gateway 102 functioning as a responder through an Internet Key Exchange (IKE) communication protocol.

More particularly, the first gateway 101 functioning as an initiator is connected with a second gateway 102 functioning as a responder through a channel 103. The communication based on IKE protocol is established through a PING-PONG process, where the first gateway 101 continues sending IKE request packet to the second gateway 102 and the second gateway 102 responses the IKE request packet. The PING-PONG process is performed until the communication channel is established.

However, a conflict situation occurs when the second gateway 102 also functions as an initiator. As shown in FIG. 1(b), there are two gateways sending the IKE request packet 104 and the IKE request packet 105 simultaneously and an error time happens.

The conventional solution to this error condition is to wait for the error time or the IKE request packet is continuously sent. However, this will result in slowing down IKE communication or even network congestion. In worse scenario, the IKE communication is failed or an excessive long time is needed to establish the IKE communication.

Therefore, solutions for solving the conflict problem for current IPSec topology are desirable.

SUMMARY OF THE INVENTION

The present invention provides a novel method for network communication, wherein the role of the gateway is adaptively changed for enhancing IKE communication efficiency.

Accordingly, the method for avoiding IKE process conflict comprises steps in that a first gateway sends a first IKE request packet and receives a second IKE request packet from a second gateway, and a decision step is performed to determine the first gateway to be one of an initiator and a responder.

The first gateway drops the second IKE request packet and functions as the initiator when the first gateway is determined to be the initiator. Moreover, the first gateway cancels the first IKE request packet and functions as the responder when the first gateway is determined to be the responder. Afterward, the first gateway performs IKE communication in response to the second IKE request packet. The first IKE request packet and the second IKE request packet function to initiator request. In the present invention, the first and the second gateway can adjust the role of initiator and responder dynamically. In other word, when one party is initiator, the other party is set to responder automatically to reduce communication setup time.

The above-mentioned decision step comprises the steps of obtaining cookies from a header of the first IKE request packet and a header of the second IKE request packet; and performing a comparison step to determine a responder from the first gateway and the second gateway by comparing the cookies.

The above-mentioned comparison step comprises the steps of computing a second digest according to the second IKE request packet; computing a first digest according to the first IKE request packet; comparing the first digest with the second digest; setting the first gateway as the initiator when the first digest is larger than the second digest; and setting the first gateway as the responder when the first digest is smaller than the second digest. In above steps, the first digest and the second digest are computed from the first IKE request packet and the second IKE request packet by hash process.

Moreover, the apparatus for avoiding IKE process conflict comprises a first gateway sending a first IKE request packet; a second gateway sending a second IKE request packet; and a controller configured for performing a decision step to determine the first gateway to be one of an initiator and a responder. The first gateway drops the second IKE request packet and functions as the initiator when the first gateway is determined to be the initiator. The first gateway cancels the first IKE request packet and functions as the responder when the first gateway is determined to be the responder. The first gateway performs IKE communication in response to the second IKE request packet.

BRIEF DESCRIPTION OF THE DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1A:
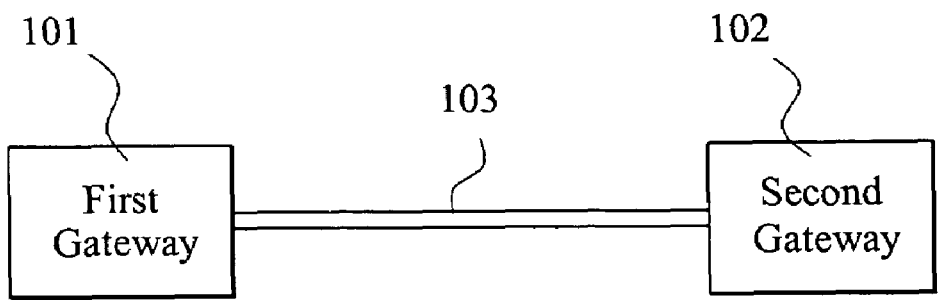
FIGS. 1(a) and 1(b) show prior art IPSec topology.
Figure 1B:
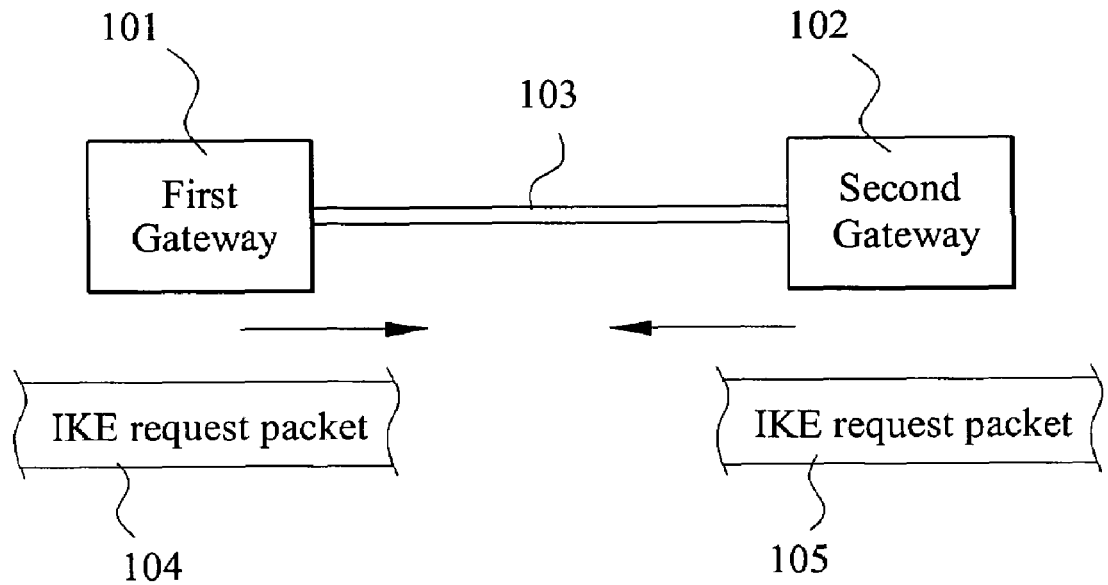
Figure 2:
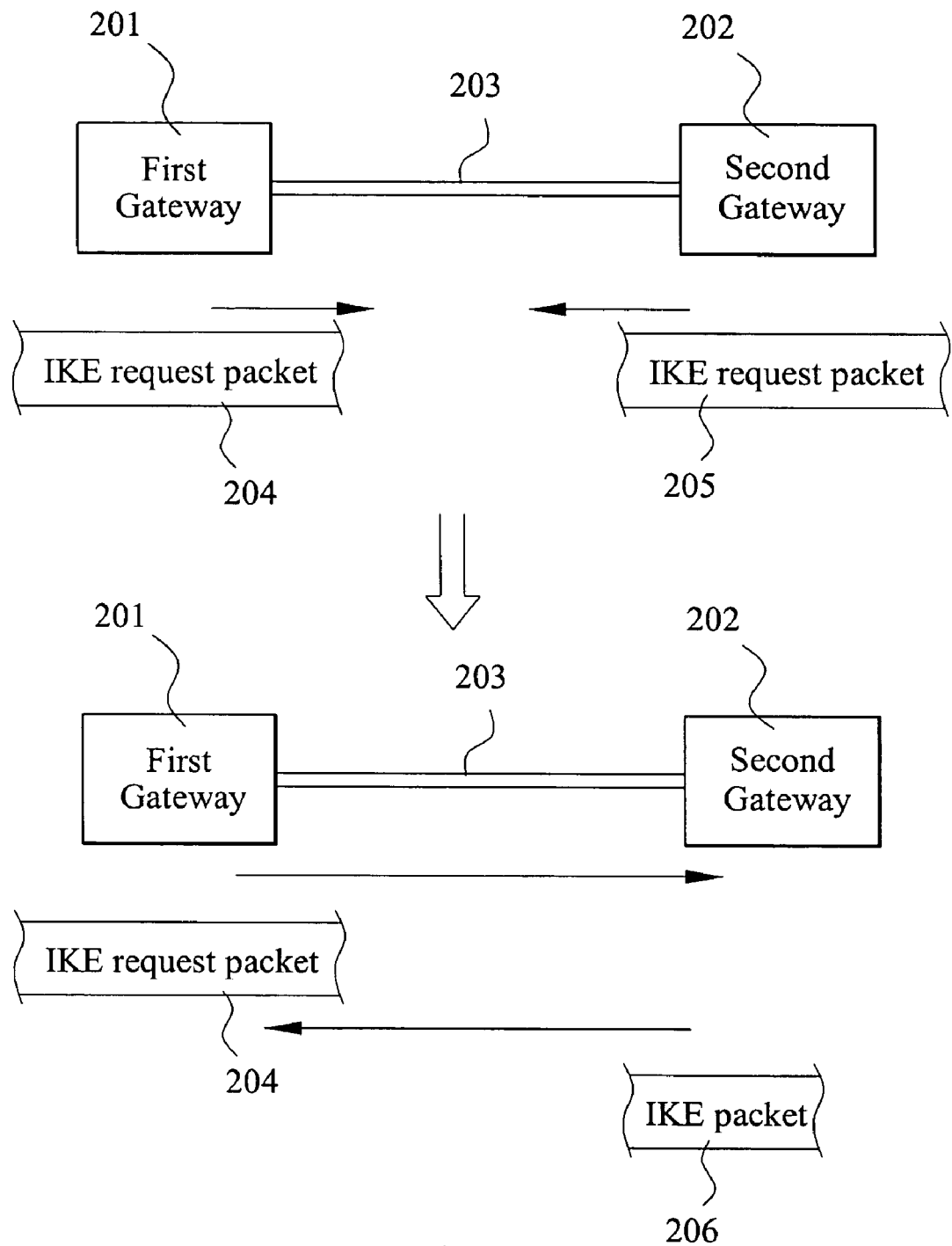
FIG. 2 shows a schematic diagram of the apparatus for avoiding IKE process conflict according to a preferred embodiment of the present invention.

FIG. 2 shows a schematic diagram of the apparatus for avoiding IKE process conflict according to a preferred embodiment of the present invention. As shown in this figure, at the beginning, both the gateway 201 and the gateway 202 function as initiators and send a first IKE request packet 204 and a second IKE request packet 205 to each other, respectively, through a channel 203 connected therebetween. When this conflict occurs, both of the gateway 201 and the gateway 202 will drop the first IKE request packet 204 and establish communication therebetween based on the second IKE request packet 205. Moreover, the gateway 202 will function as responder and sends an IKE packet 206 to the gateway 201 in response to the first IKE request packet 204.

The above procedure requires a decision step for determining a responder between the two gateways. The decision step is performed by a cookie from headers in the first IKE request packet 204 and the second IKE request packet 205.

Figure 3:
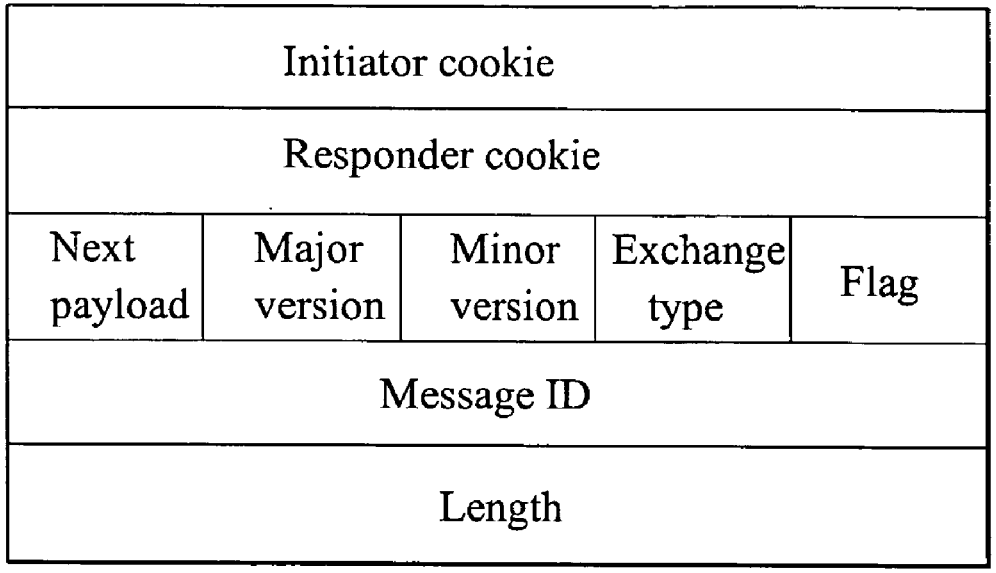
FIG. 3 shows one feasible format of the header in the IKE request packet.

FIG. 3 shows one feasible format of the header in the first IKE request packet 204 and the second IKE request packet 205. The header comprises fields such as initiator cookie, responder cookie, next payload, major version, minor version, exchange type, flag, message ID and length. Those fields are well known art and are not described in detail here.

The above-demonstrated header structure is one of feasible choices and is not intended to be limitation of the present invention. The cookie is an 8 bytes random number and is part of the IKE packet header for each IKE connection. In other word, the cookie field has fixed position and length, and the content thereof is changeable for each IKE connection.

When the first gateway receives the second IKE request packet 205, the first gateway obtains a cookie from the second IKE request packet 205, and then obtains another cookie from the first IKE request packet 204 sent therefrom. One of the two gateways is determined to be the responder by the two cookies through a comparison step.

Figure 4:
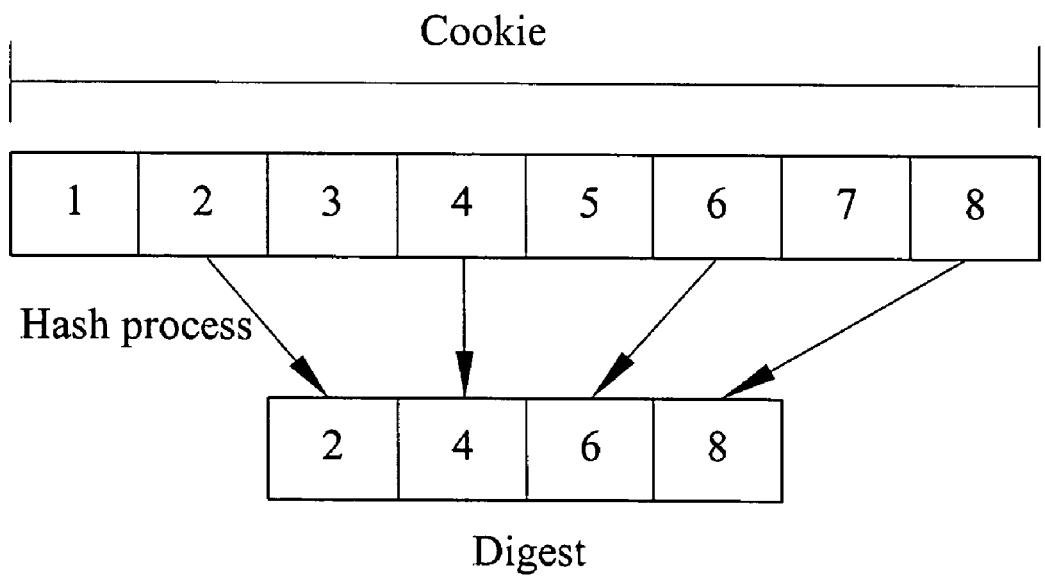
FIG. 4 shows a comparison step according to a preferred embodiment of the present invention.

FIG. 4 shows a comparison step according to a preferred embodiment of the present invention. The first gateway and the second gateway perform a hash process to the received cookies to acquire a 4 bytes digest from the 8 bytes cookie. Moreover, the 8 bytes cookie can be processed to information of reduced bytes number by other process than hash process.

Thereafter, the two digests derived from the two cookies are compared. The gateway with larger digest is used as initiator and the gateway with smaller digest is used as responder. The above-mentioned steps for establishing IKE channel involves complicated parametric computation; therefore, those steps are executed by external module or controller such as CPU (not shown). Moreover, those steps can also be executed by gateway itself or hardware accelerator if the hardware accelerator has sufficient computation ability.

Figure 5:
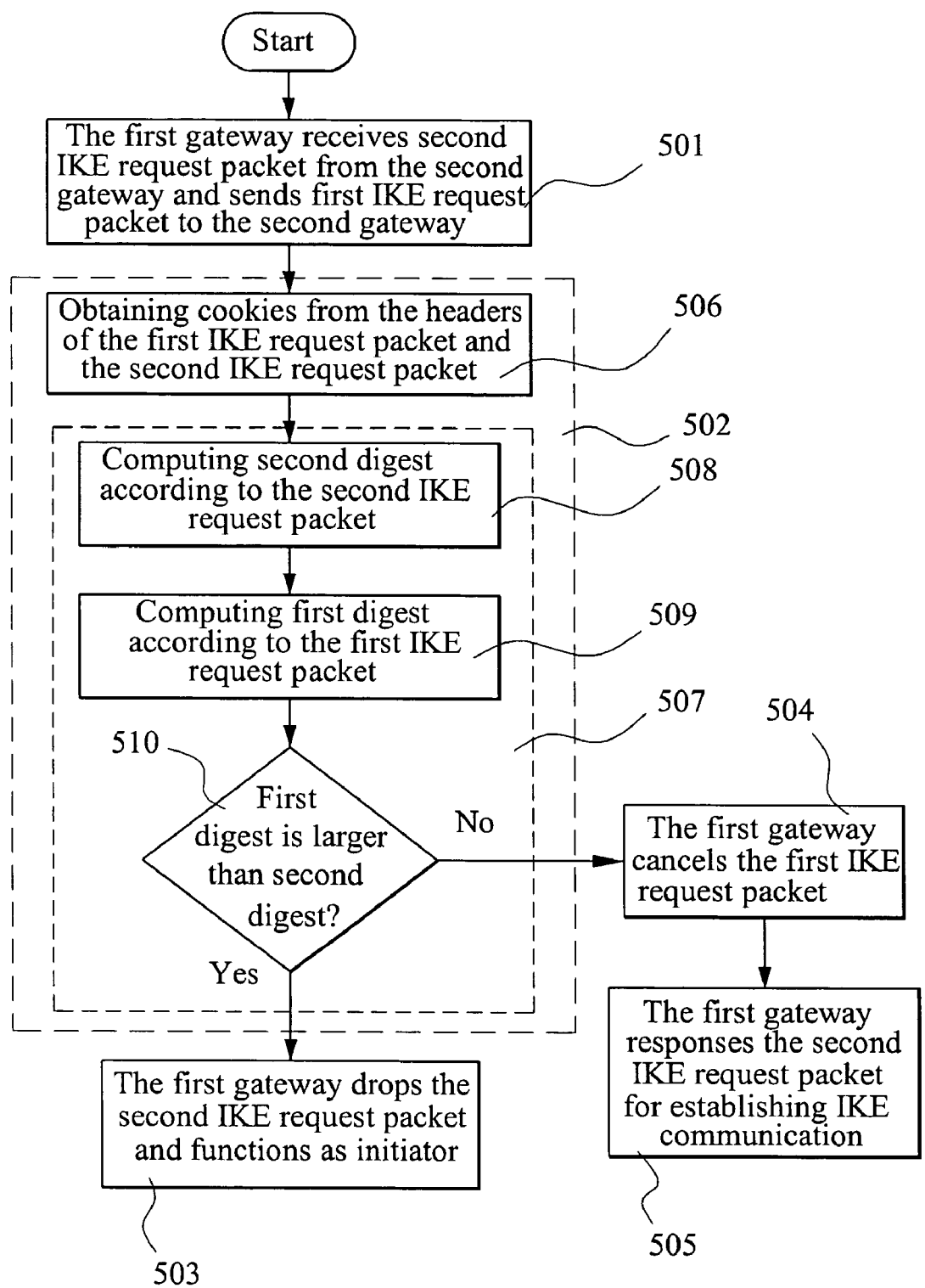
FIG. 5 shows the flowchart for implementing the method for avoiding IKE process conflict according to a preferred embodiment of the present invention.

FIG. 5 shows the flowchart for implementing the method for avoiding IKE process conflict according to a preferred embodiment of the present invention. In step 501, the first gateway receives a second IKE request packet from the second gateway and sends a first IKE request packet to the second gateway. The first gateway will function as responder without conflict if the second IKE request packet is received before sending of the first IKE request packet by the first gateway. However, the conflict situation where both the first gateway and the second gateway send the first IKE request packet and the second IKE request packet simultaneously should be solved.

In a decision step 502, the first gateway is determined to be either an initiator or a responder. In case that the first gateway is an initiator, a step 503 is performed and the first gateway will drop the second IKE request packet and function as an initiator. In case that the first gateway is a responder, a step 504 is performed and the first gateway will cancel the first IKE request packet and then a step 505 is performed. In the step 505, the first gateway function as a responder and responses the second IKE request packet for establishing IKE communication.

According to a preferred embodiment of the present invention, the decision step comprises step 506 and the comparison step 507. The step 506 fetches cookies from the headers of the first IKE request packet and the second IKE request packet.

According to one preferred embodiment of the comparison step 507 includes sub steps 508, 509 and 510. In sub step 508, the second digest is computed according to the second IKE request packet. In step 509, the first digest is computed according to the first IKE request packet. The step 510 judges whether the first digest is larger than the second digest. If true, the first gateway functions as initiator and the step 503 is performed; else the second gateway functions as responder and the steps 504 and 505 are performed.

The above-described decision step and comparison step can be distinct from the preferred embodiment and varied by those skilled in the related.

To sum up, the apparatus and method for avoiding IKE process conflict according to the present invention can set one of the two gateways competing for initiator to a responder when conflict occurs. Therefore, the waiting time is reduced and the network efficiency can be enhanced.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A method for preventing Internet Key Exchange (IKE) process conflict, comprising the steps of:
   a first gateway sending a first IKE request packet and receiving a second IKE request packet from a second gateway;
   performing a decision step to determine the first gateway to be one of an initiator and a responder;
   the decision step comprising:
   obtaining cookies from a header of the first IKE request packet and a header of the second IKE request packet; and
   performing a comparison step to determine a responder from the first gateway and the second gateway by comparing the cookies, wherein the comparison step comprises:
   computing a second digest according to the second IKE request packet;
   computing a first digest according to the first IKE request packet;
   comparing the first digest with the second digest; setting the first gateway as the initiator when the first digest is larger than the second digest; and
   setting the first gateway as the responder when the first digest is smaller than the second digest;
   the first gateway dropping the second IKE request packet and functioning as the initiator when the first gateway is determined to be the initiator; and
   the first gateway canceling the first IKE request packet and functioning as the responder when the first gateway is determined to be the responder, the first gateway performing IKE communication in response to the second IKE request packet.

2. The method for preventing IKE process conflict as in claim 1, wherein the first IKE request packet and the second IKE request packet function as initiator requests.

3. The method for preventing IKE process conflict as in claim 1, wherein the header of each packet comprises fields of initiator cookie, responder cookie, next payload, major version, minor version, exchange type, flag, message ID and length.

4. The method for preventing IKE process conflict as in claim 1, wherein the first digest and the second digest are computed from the first IKE request packet and the second IKE request packet by hash process.

* * * * *